Patented Sept. 19, 1944

2,358,335

UNITED STATES PATENT OFFICE 2,358,335

PANTOTHENIC PREPARATIONS AND METHODS OF OBTAINING THE SAME

Elmer J. Lawson, Hervey C. Parke, and Leon A. Sweet, Detroit, Mich., assignors to Parke, Davis & Company, Detroit, Mich., a corporation of Michigan No Drawing. Application January 4, 1941, Serial No. 373,193

10 Claims. (Cl. 260—482)

This invention relates to vitamin compositions and their preparation. More particularly, this invention relates to the preparation of pantothenic acid, a vitamin of the B complex occurring in liver and in yeast.

Pantothenic acid has the following structural formula,

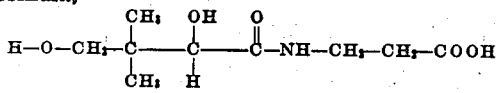

and may be said to be the $\beta$-alanide of $\alpha,\gamma$-dihydroxy-$\beta,\beta$-dimethylbutyric acid. Pantothenic acid and its salts, almost all of which are very soluble in water, are effective in stimulating the growth of yeast, bacteria and various other organisms.

According to the present invention, synthetic pantothenic acid preparations are obtained by condensing $\alpha,\gamma$ - dihydroxy - $\beta,\beta$ - dimethylbutyramide with derivatives of $\beta$-alanine such as the sodium salt, the ethyl ester or other derivatives in which the amino group of the $\beta$-alanine is rendered reactive, i. e., in which the betaine character is suppressed by conversion of the —COOH group into a functional derivative no longer having acidic properties, such derivatives generally include derivatives of the —COOH, such as its salts, its nitrile, its esters, its amides, and the like. Derivatives of this sort are set forth in Houben-Weyl, Arbeitsmethoden der organischen Chemie, second edition, III, 723–42.

The $\alpha,\gamma$-dihydroxy-$\beta,\beta$-dimethylbutyramide of this invention is itself a new compound and of great utility as an intermediate for the preparation of pantothenic acid. This new amide may very conveniently be prepared from $\alpha$-hydroxy-$\beta,\beta$-dimethyl-$\gamma$-butyrolactone by the action of ammonia. This may be accomplished either by passing ammonia into a solution of the lactone in organic solvents such as methanol or ethanol, or more conveniently, by reacting the lactone with liquid ammonia, and then removing the excess ammonia to obtain the amide.

We have found that $\alpha,\gamma$-dihydroxy-$\beta,\beta$-dimethylbutyramide condenses with derivatives of $\beta$-alanine such as the salts of $\beta$-alanine with alkali metals and the esters of $\beta$-alanine with aliphatic, or araliphatic alcohols or with phenols. The condensation is best conducted above room temperature, as from 50–150° C., so that the ammonia formed may readily escape.

The invention may be illustrated by the following examples.

Example 1

(a) Racemic $\alpha$ - hydroxy - $\beta,\beta$ - dimethyl - $\gamma$ - butyrolactone may be prepared for example as described by Kohn and Neustadter, Monatsh. 39, 293 (1918). The lactone of melting point about 56° as thus obtained is suitable for use without further purification.

(b) 75 grams of $\alpha$-hydroxy-$\beta,\beta$-dimethyl-$\gamma$-butyrolactone is dissolved in about 400 cc. of liquid ammonia in an open vessel such as a 2 l. flask. The lactone dissolves immediately in the liquid ammonia with formation of a clear solution.

After standing overnight, all of the ammonia has evaporated to leave a crystalline solid. This solid is triturated with petroleum ether, collected on a funnel and washed several times with petroleum ether. The crude product thus obtained is recrystallized from about ten times as much acetone. As thus obtained, the product, dl-$\alpha$-$\gamma$-dihydroxy-$\beta,\beta$-dimethylbutyramide, has a melting point of 126–127° C. It is insoluble in petroleum ether and chloroform, somewhat soluble in acetone and quite soluble in alcohol. With aqueous sodium carbonate solution no ammonia is evolved, but with boiling aqueous sodium hydroxide solution ammonia is evolved. This shows that the substance is an amide rather than an ammonium salt. The yield is about 60 grams.

A sample was analyzed with the following results: Calc. for C—49.0%; H—8.90%; N—9.52%; found, C, 49.4%, 49.38%; H, 9.19%, 9.00%; N, 9.43%, 9.51%.

Instead of using the racemic lactone as above to obtain the racemic amide, one may use either of the optically active forms of the lactone, thereby obtaining the optically active forms of the amide. Thus, the (—)$\alpha$-hydroxy-$\beta,\beta$-dimethyl-$\gamma$-butyrolactone ($[\alpha]_D^{25}$=—50.4° in 2% aqueous solution), obtained from the more insoluble quinine salt in the resolution of the dl-lactone, yields the (+) - $\alpha,\gamma$ - dihydroxy - $\beta,\beta$ - dimethyl - butyramide having a melting point of 94° C. and $[\alpha]_D^{25}$=+52° (in 2% methanolic solution). Similarly, the (+)=$\alpha$-hydroxy-$\beta,\beta$-dimethyl-$\gamma$-butyrolactone ($[\alpha]_D^{25}$=approximately +50° in 2% aqueous solution), obtained as the more soluble quinine salt in the resolution of the dl-lactone, yields the (—)-$\alpha,\gamma$-dihydroxy-$\beta,\beta$-dimethyl-butyramide having a melting point of 94° C. and $[\alpha]_D^{25}$ of approximately —52°. The optically active amides have in each case the same melting point, 94° C., and rotations of the same magnitude, but opposite sign.

Example 2

A mixture of 1.28 grams of dl-α,γ-dihydroxy-β,β-dimethylbutyramide and 0.970 gram of the sodium salt of β-alanine are mixed in a 6" test tube and heated for about 3½ hours at 100° C. Ammonia is evolved and the mixture melts to a stiff sirup. After cooling, the residue may be pulverized and used as the sodium salt of dl-pantothenic acid.

Biological assays on the preparation obtained as described above show an activity corresponding to about a 70% yield of the sodium salt of pantothenic acid, assuming that the racemic compound is only half as active as the naturally occurring form.

Instead of using the sodium salt of β-alanine in the above preparation, other alkali metal β-alanates such as potassium β-alanate, or esters such as the methyl ester or the ethyl ester of β-alanine may be used with analogous results.

Instead of using racemic α,γ-dihydroxy-β,β-dimethylbutyramide in this preparation, the optical antipodes, i. e., (+)-α,γ-dihydroxy-β,β-dimethylbutyramide or (−)-α,γ-dihydroxy-β,β-dimethylbutyramide may be used, thereby forming in the case of the (+)-amide, the active (+)-pantothenic acid as its sodium salt.

What we claim as our invention is:

1. The process which comprises treating α-hydroxy-β,β-dimethyl-γ-butyrolactone with ammonia, and reacting the α,γ-dihydroxy-β,β-dimethyl butyramide thus formed with a compound of the class consisting of an alkali metal salt of β-alanine and a lower aliphatic ester of β-alanine.

2. The process which comprises reacting α-hydroxy-β,β-dimethyl-γ-butyrolactone with liquid ammonia, allowing the excess ammonia to evaporate, and reacting the α,γ-dihydroxy-β,β-dimethyl butyramide with a compound of the class consisting of an alkali metal salt of β-alanine and a lower aliphatic ester of β-alanine.

3. The process which comprises treating α-hydroxy-β,β-dimethyl-γ-butyrolactone with ammonia, and heating the α,γ-dihydroxy-β,β-dimethylbutyramide thus produced with an alkali metal salt of β-alanine.

4. The process which comprises treating α-hydroxy-β,β-dimethyl-γ-butyrolactone with ammonia, and heating the α,γ-dihydroxy-β,β-dimethylbutyramide thus produced with the sodium salt of β-alanine.

5. The process which comprises treating α-hydroxy-β,β-dimethyl-γ-butyrolactone with ammonia, and heating the α,γ-dihydroxy-β,β-dimethylbutyramide thus produced with a lower aliphatic ester of β-alanine.

6. The process which comprises reacting α,γ-dihydroxy-β,β-dimethyl butyramide with a compound of the class consisting of an alkali metal salt of β-alanine and a lower aliphatic ester of β-alanine.

7. The process which comprises heating α,γ-dihydroxy-β,β-dimethylbutyramide with an alkali metal salt of β-alanine.

8. The process which comprises heating α,γ-dihydroxy-β,β-dimethylbutyramide with the sodium salt of β-alanine.

9. The process which comprises heating α,γ-dihydroxy-β,β-dimethylbutyramide with a lower aliphatic ester of β-alanine.

10. The process which comprises reacting α,γ-dihydroxy-β,β-dimethyl butyramide with the ethyl ester of β-alanine.

ELMER J. LAWSON.
HERVEY C. PARKE.
LEON A. SWEET.